(12) United States Patent
Domeck et al.

(10) Patent No.: US 6,446,501 B1
(45) Date of Patent: Sep. 10, 2002

(54) RESTRAINED VEHICLE DYNAMOMETER

(75) Inventors: Douglas C. Domeck, Akron; Douglas R. Van Arnam, Wadsworth; Marion G. Pottinger, Akron; James E. McIntyre, III, Cuyahoga Falls, all of OH (US)

(73) Assignee: Smithers Scientific Services, Inc., Akron, OH (US)

( * ) Notice: Subject to any disclaimer, the term of this patent is extended or adjusted under 35 U.S.C. 154(b) by 0 days.

(21) Appl. No.: 09/657,962

(22) Filed: Sep. 8, 2000

(51) Int. Cl.[7] .............................................. G01M 17/02
(52) U.S. Cl. ................................................. 73/146; 73/8
(58) Field of Search .............................. 73/146, 146.2, 73/146.3, 146.4, 146.5, 8, 669, 670

(56) References Cited

U.S. PATENT DOCUMENTS

| | | | |
|---|---|---|---|
| 2,290,618 A | * 7/1942 | Bosomworth | |
| 3,483,744 A | * 12/1969 | Goldberg | |
| 4,432,229 A | * 2/1984 | Nowogrodzki | 73/146 |
| 4,442,709 A | * 4/1984 | Waters | 73/146 |
| 4,455,866 A | 6/1984 | Barrigar | 73/117 |
| 4,550,598 A | * 11/1985 | Breedyk et al. | 73/146 |
| 4,748,844 A | 6/1988 | Yoshikawa et al. | 73/146 |
| 4,798,088 A | 1/1989 | Haeg et al. | 73/669 |
| 4,821,582 A | 4/1989 | Meyer et al. | 73/862.04 |
| 4,909,073 A | * 3/1990 | Takahashi et al. | 73/146 |
| 4,938,055 A | 7/1990 | Tsuda | 73/8 |
| 5,101,660 A | 4/1992 | La Belle | 73/117 |
| 5,111,685 A | 5/1992 | Langer | 73/117 |
| 5,402,674 A | 4/1995 | Ganzhorn, Jr. et al. | 73/117 |
| 5,864,056 A | 1/1999 | Bell et al. | 73/146 |
| 5,952,567 A | 9/1999 | Meyer et al. | 73/146 |
| 5,969,268 A | 10/1999 | Sommerfeld et al. | 73/862.041 |
| 6,038,933 A | 3/2000 | Meyer | 73/862.045 |

OTHER PUBLICATIONS

2000–01–0110, *SAE Technical Paper Series*, SAE World Congress, Detroit, MI. Mar. 6–9, 2000.

* cited by examiner

*Primary Examiner*—Eric S. McCall
(74) *Attorney, Agent, or Firm*—Renner, Kenner, Greive, Bobak, Taylor & Weber

(57) ABSTRACT

A method of testing at least one tire of a test vehicle provided with a sensor for measuring the forces and moments of at least one test tire, the method including coupling the test vehicle to an anchor vehicle wherein the coupling restricts the lateral and longitudinal and yaw movement of the test vehicle relative to the anchor vehicle such that the anchor vehicle maintains the course and velocity of the test vehicle; and performing testing of the test vehicle while the test vehicle is coupled to the anchor vehicle.

15 Claims, 6 Drawing Sheets

RESTRAINED VEHICLE DYNAMOMETER

TECHNICAL FIELD

In general, the present invention relates to vehicle testing. More particularly, the present invention relates to road testing a vehicle to measure tire performance. Most particularly, the present invention relates to isolating the forces on a tire as it is driven on an actual driving surface.

BACKGROUND ART

Tire testing is an important component in the ongoing pursuit of improved vehicle performance and safety. In this pursuit, many entities have attempted to measure performance characteristics of tires through the use of simulators and road testing.

Several examples of simulators are present in the art. Some of these simulators test a tire removed from the vehicle. Others test an entire vehicle and may analyze the performance of the vehicle's tires during the simulation. Typically, in these simulators, the test vehicle is situated on an endless simulated driving surface that permits limited operation of the vehicle. Early simulators of this type relied on laterally fixed simulated surfaces such as roller beds or a pair of cylinders positioned under the vehicle's tires allowing only straight-line testing of the vehicle without cornering.

To accommodate some cornering, one simulator has been provided with a widened test surface and lateral restraints that allowed limited lateral movement of the vehicle. Still another simulator has incorporated moveable track members that track the direction of the tire.

While advances have been systematically made in the simulator art, these devices still suffer from being costly, cumbersome, immobile, and insufficient for accurately replicating actual tire to driving surface contact. To accommodate an entire vehicle, the simulator must be large. This, in combination with the extensive controls and instrumentation used to monitor and manipulate the test vehicle, not only leads to a staggering cost of performing these tests, but it makes the simulator immobile. Thus, to perform testing on a test vehicle's tire, the test vehicle must be brought to the simulator's site, where it is tested without attention to the actual driving surfaces that the tire may be operated on.

On the subject of the tire-to-driving surface contact, most simulators are limited to the artificial surface presented by the belts or rollers. One simulator, however, has used textured belts to attempt to produce changes or variations in the simulated surface similar to those found during actual driving conditions. As will be appreciated, however, the textured belts cannot accurately match actual driving surfaces and the effects of weather on these surfaces.

To that end, road testing is often used to generate tire performance data on an actual driving surface. Test tires are equipped with transducers and driven on a test track to analyze their performance. During these tests, it is desirable to isolate the forces acting on the tire of a test vehicle. But, the test vehicle's reaction to changes in the tractive forces caused by maneuvering prohibits true isolation of the forces on the tire. For instance, when measuring tire forces generated by cornering, as the tire is turned, the reactive forces at the tire change causing the vehicle to change direction. As a result, the vehicle reacts apart from the tire producing changes in weight distribution and suspension configuration among others. Similar changes in the vehicle's dynamics occur during braking and acceleration. Under the forces caused by these actions, the weight distribution of the vehicle shifts between the tires. As a consequence, the tractive forces at the tires, measured by the tire transducers, are influenced by the movement of the vehicle during maneuvers. Thus, the change in the heading angle and load shift make it considerably more difficult to measure forces accurately at the tire.

One known device is capable of isolating the force on a tire. This device has been used to observe tire performance on different soils. In this device, a rail system has been constructed over a series of soil bins. The soil bins are essentially a series of containers formed by partitions in a long concrete channel. The rails are installed on either side of the channel along the top of the channel's walls. The test vehicle is suspended from the rails allowing the tires to contact the soils within each bin. While the rails are capable of counteracting changes in vehicle dynamics caused by maneuvering actions, the enormity of this system makes it impractical from cost and mobility standpoints. Like the vehicle simulator art, the rail system is fixed and only allows testing at the testing facility.

DISCLOSURE OF THE INVENTION

In light of the existing art, it is an object of the present invention to produce a mobile method of testing a vehicle tire.

It is a further object of the present invention to present such a method of testing that improves the isolation of forces at the tire.

In view of at least one of these objects, the present invention provides a method for obtaining forces and moments at a tire of a test vehicle provided with a sensor for measuring the forces and moments, the method including coupling the test vehicle to an anchor vehicle having tractive forces greater than the test vehicles, wherein the coupling restricts the lateral, longitudinal, and yaw movement of the test vehicle relative to the anchor vehicle such that the anchor vehicle maintains the course and velocity of the test vehicle during testing; and performing dynamic testing of the test vehicle while the test vehicle is coupled to the anchor vehicle.

The present invention further provides a restrained vehicle dynamometer including a test vehicle coupled to an anchor vehicle such that the test vehicle is substantially restrained longitudinally, laterally, relative to the anchor vehicle and at least one sensor operatively engaging at least one tire of the test and in terms of yaw vehicle wherein the sensor is in communication with a controller.

The present invention further provides a method of testing a test tire on a test vehicle, the test vehicle having at least one sensor proximate the test tire for sensing forces and moments thereon, the method including coupling the test vehicle to an anchor vehicle such that the anchor vehicle is capable of maintaining the velocity and direction of the test vehicle, wherein the vehicles are coupled in substantially side-by-side relation to each other; locating the sensor proximate an outboard tire of the test vehicle; and performing dynamic testing of the test vehicle.

PREFERRED EMBODIMENT FOR CARRYING OUT THE INVENTION

Figure 1:
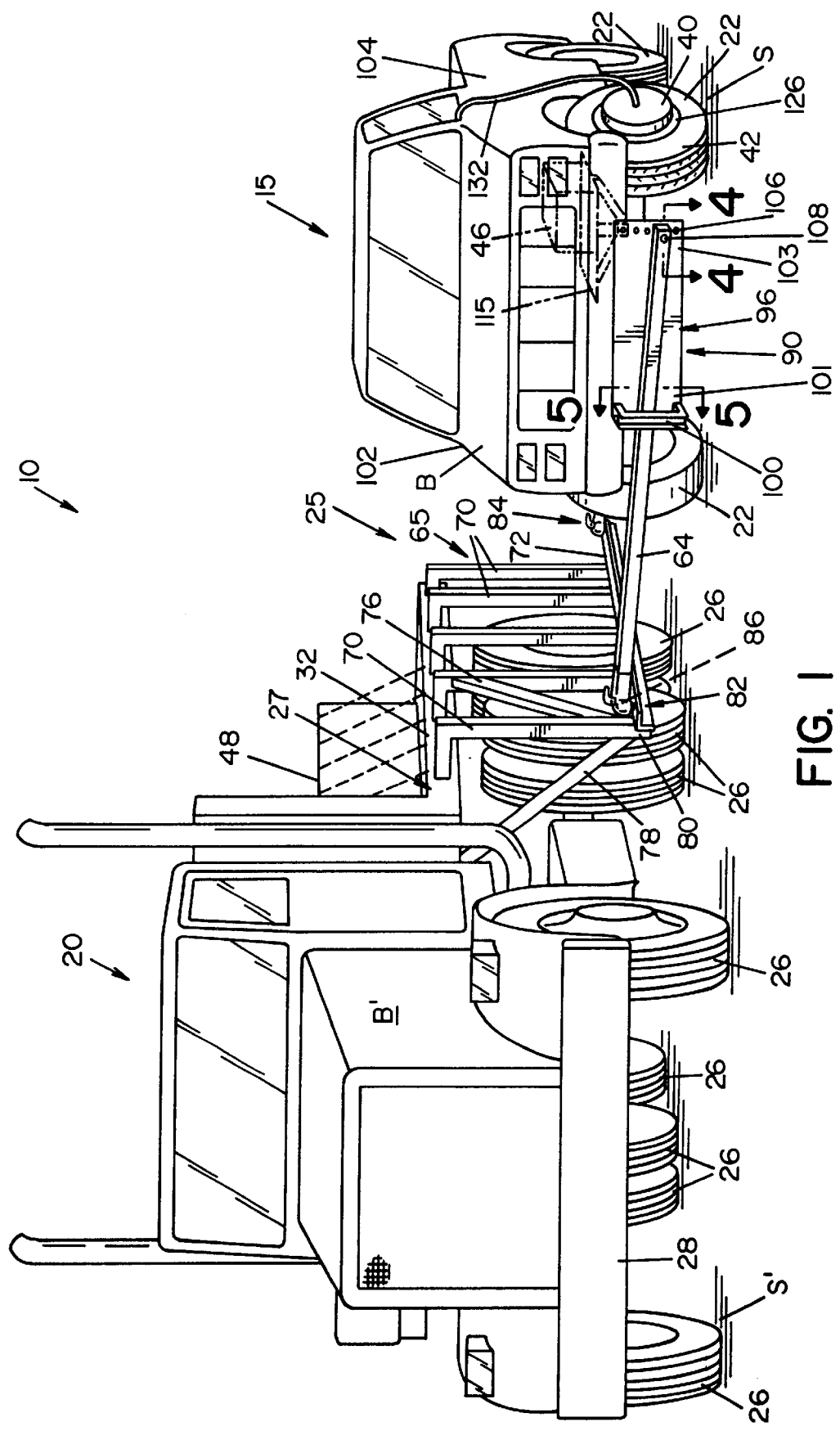
FIG. 1 is a perspective view depicting one embodiment of a restrained vehicle dynamometer according to the present invention illustrating a test vehicle constrained by an anchor vehicle.

The present invention provides a restrained vehicle dynamometer generally indicated by the numeral 10 in the accompanying figures. To allow testing on actual driving surfaces, with a moving test vehicle, the present invention restrains a test vehicle generally indicated by the numeral 15, to allow application of tractive forces independent of the dynamic response of the test vehicle 15. To accomplish this with a moving test vehicle 15, the present invention couples the test vehicle 15 to an anchor vehicle, generally indicated by the numeral 20, which constrains lateral, longitudinal, and yaw movement of the test vehicle 15. In this way, the anchor vehicle 20 maintains the test vehicle's direction and velocity despite application of maneuvering forces created by cornering, braking, or acceleration of the tires 22 of the test vehicle reducing the influence of the vehicle's dynamics on the test tire forces.

As can be appreciated, many vehicle restraints may be used to achieve proper coupling of the vehicles, one example is shown and described herein. This example, which will be described fully below, is not limiting as other equally applicable types of restraints would be readily apparent to one of ordinary skill in the art.

In terms of testing, many road tests may be performed on the test vehicle 15 and the method disclosed herein may be beneficial in these tests as well. When road testing tires and in some simulators, application of maneuvering forces causes changes in the vehicle dynamics. Specifically, forces extraneous to those between the tire and the driving surface come into play and may interfere with attempts to accurately measure the forces and moments on the tire. Some examples include centrifugal and centripetal forces during cornering and inertial forces created by changes in the direction and velocity of the vehicle. For example, when cornering, a vehicle traveling in a given direction at a given velocity deviates from the original direction due to application of cornering forces by the tires. The inertia of the vehicle, vehicle suspension and its body members prevent the vehicle from changing velocity vectors instantaneously and, thus, the forces of the vehicle interact with the forces of the tires affecting the inertial forces that can be generated at the tires. Similar interaction of vehicle forces occurs with the tire forces during acceleration and braking. To reduce and possibly eliminate this type of interaction, the anchor vehicle 20 maintains the velocity and heading of test vehicle 15, collectively represented by vector $H_T$, of the test vehicle 15.

Additionally, maintenance of the test vehicle velocity and heading reduces sources of error caused by the dynamics of an unrestrained vehicle. In particular, when a vehicle is not restrained, the cornering forces generated at the tire upon turning cause the vehicle to react in response to these forces. When cornering, the vehicle is directed at a heading H, its tires are directed at a tire heading T, but the vehicle travels in a direction D resulting from the balance of forces between the vehicle and the tires. These vectors define three angles, namely, the slip angle (SLA), steering angle (STA), and side slip angle (SSA). The slip angle SLA is the angle from a plane through the center of the tire or tire heading T to the vehicle direction D. The steering angle STA is measured from the plane T through the center of the tire to the plane running through the center of the vehicle. The side slip angle SSA is the angle between the heading vector H and the actual direction D of the vehicle 15. These angles are related in that the slip angle SLA equals the steering angle STA less the side slip angle SSA.

$$SLA = STA - SSA \tag{1}$$

Since side slip angle SSA is difficult accurately measured, it is difficult to account for the side slip angle SSA in the above equation and arrive at the slip angle SLA.

When a vehicle is unrestrained, the side slip angle SSA is constantly changing as the vehicle reacts to the cornering forces generated by the tires. It will be appreciated that the changing nature of this angle further complicates calculation of the slip angle SLA, introducing additional error into the measurements taken at the tire.

Turning to the present invention, the restrained vehicle dynamometer 10 in part reduces the influence of vehicle dynamics by minimizing side slip angle SSA. By minimizing side slip angle SSA in equation 1, the slip angle SLA may be approximately the same as the steering angle STA. The steering angle STA is one that may be accurately measured. By minimizing the side slip angle SSA, i.e., making its effect negligible in equation 1, a reasonable calculation of slip angle SLA may be obtained by measuring the steering angle STA. Dynamometer 10 restrains test vehicle 15, maintaining the test vehicle heading $H_T$, in part, removing the dynamic of a constantly changing slip angle. Further, through anchor vehicle 20, dynamometer 10 compensates for forces generated at the tires 22 of test vehicle 15 to reduce the deviation of test vehicle 15 from its heading $H_T$. In this way, the direction of travel DT for test vehicle 15 is closer to heading $H_T$, reducing the magnitude of side slip angle SSA. In this way, the restrained vehicle dynamometer 10 may reduce or eliminate the effect of vehicle dynamics on the measurement of slip angle SLA.

It should be noted that in the figures, the magnitudes of the angles SSA, STA, and SLA have been greatly exaggerated for purposes of illustration and to make these angles visible. During testing, anchor vehicle 20 and test vehicle 15 are operatively attached by a coupler 25. To prevent the anchor vehicle 20 from allowing deviation in the test vehicle's heading $H_T$ or to otherwise effectively restrain the test vehicle 15, the anchor vehicle 20 is provided with tractive forces, those between the ballast tires 26 and the driving surface S, greater than the tractive forces of the test vehicle 15. In this way, the tractive forces of the anchor vehicle 20 overcome those applied by the test vehicle 15.

The provision of suitable tractive forces for the anchor vehicle 20 may be accomplished in a variety of ways including manipulation of the vehicle size and weight, the tires 26, and the driving surface S. Such manipulation should be apparent to those skilled in the art, and would include among others selecting an anchor vehicle 20 larger than the test vehicle 15, adding a load 48 to the anchor vehicle 20, using a vehicle with a larger tire footprint or larger combined footprint, or placing the anchor vehicle 20 on a surface S' having a greater coefficient of friction than the surface S on which the test vehicle 15 is operated.

The tires 26 of anchor vehicle 20 are selected to be suitably stiff such that forces applied by the test vehicle 15 through the coupling 25 cause minimal yaw of the anchor vehicle 20, since such deviation may complicate analysis of results of testing. The anchor vehicle 20 may additionally be selected or modified to improve its stiffness as necessary.

Similarly, the coupler 25 may be made suitably stiff to reduce deflection thereof. As will be understood, some flexion will be present in either vehicle 15, 20 or the coupler 25. With that in mind, the coupling of the vehicles 15, 20 will allow some play and may additionally be constructed to allow minimal movement of the vehicles 15, 20. For example, the coupler 25 may permit the test vehicle 15 and anchor vehicle 20 to pitch, roll, or move vertically to an extent. While some movement is permitted between the vehicles 15, 20, if desired, these movements may be limited by further restraint. Relative to the anchor vehicle 20, the coupler 25 preferably maintains the fore and aft position and restricts yaw of the test vehicle 15 to maintain the heading $H_T$ of test vehicle 15.

Figure 2:
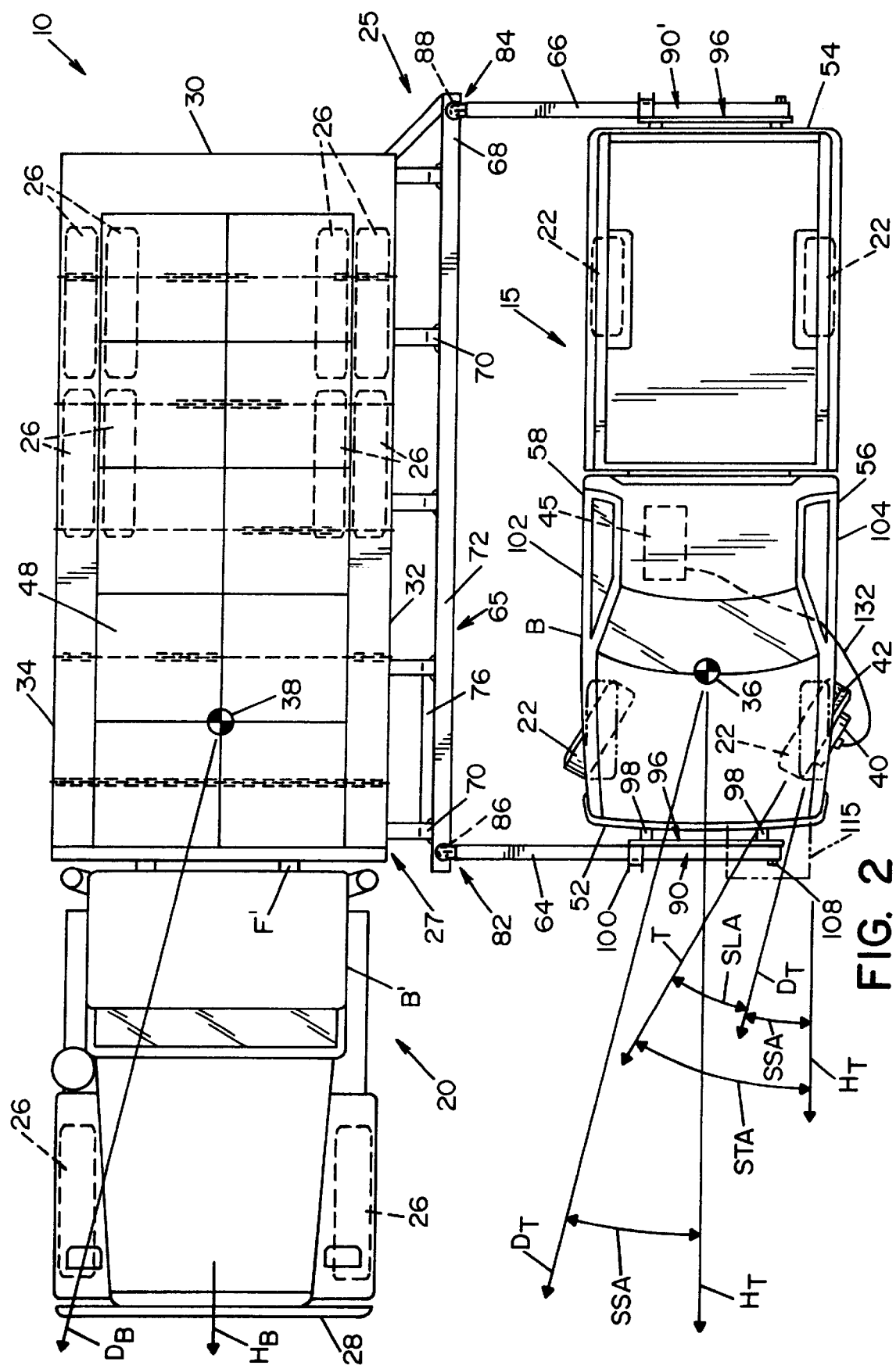
FIG. 2 is a top elevational view depicting coupling of the ballast and test vehicles.

The test vehicle 15 may be coupled at any location adjacent the perimeter 27 of the anchor vehicle 20 including the front 28, rear 30, left 32, and right 34 positions. The longitudinal side positions 32, 34 to the left and right of the anchor vehicle 20 may be used to bring the centers of gravity 36, 38 of each vehicle 15, 20 closer to each other, reducing resulting moments between the vehicles 15, 20. Alternatively, the vehicles 15, 20 may be configured such that the center of gravity 38 of the anchor vehicle 20 is substantially aligned with the steering tires 22' of the test vehicle 15. One example of such a coupling is shown in FIG. 2. Preferably, the coupler 25 attaches to the test vehicle 15 at the roll and pitch centers of the test vehicle 15 to reduce force-induced load transfer during testing.

To perform testing, a sensor 40 may be attached to the tire 22 or otherwise placed in a position for measuring forces and moments on the tire 22. A large number of commercially available sensors 40 may be used from manufacturers including MTS, GSE, AMTI, and Kistler, among others. In addition, suitable wheel force transducers are described in U.S. Pat. Nos. 5,952,567; 5,969,268; and 6,038,933 incorporated herein by reference. As described in these patents, the restraint assembly of U.S. Pat. Nos. 5,952,567 may be used in combination with the load cells described in the latter patents 5,969,268 and 6,038,933. For sake of simplicity, the wheel force transducers and sensors will be collectively referred to as a sensor 40.

Single or multiple sensors 40 may be used during testing to measure the forces on the test vehicle's tires 22. In particular, sensors 40 may be mounted on a single tire, 22 or multiple tires 22 may be equipped with sensors 40 to analyze the performance of each tire 22. For simplicity, single and multiple sensed tires will be referred to collectively as a test tire, generally referred to as 42 in the figures. Since any tire may be provided with a sensor 40, the selection of the particular tire 22 to be monitored is largely a choice based on the desired information of the user. For instance, sensors 40 may be placed on the drive tires, to analyze acceleration of the driven wheel, or placed on tires capable of steering the vehicle 15 to analyze the performance of these wheels when turned. Information concerning the non-active tires may also be desired and sensors 40 may be placed on those tires separately or in combination with sensors placed on the active tires. Further, in terms of testing, certain surface conditions may cause the tires 26 of anchor vehicle 20 and the test vehicle 15, alone or in combination, to influence each other, such as, by scattering or splashing debris. This is particularly true when testing on wet surfaces, snow covered surfaces, soils, gravel, and muddy surfaces. To that end, sensors 40 may be placed on those tires 22 that are less likely to be influenced by debris, such as the front tires in a forward traveling test vehicle 15. Alternatively, it may be desirable to study the influence of the debris on the tire 22. In those cases, the sensor 40 may be placed on those wheels affected by debris from the other tires 22, 26. In any of these scenarios, the sensors 40, as used in the present invention, are capable of measuring forces on the tires 22 with reduced influence from the vehicle dynamics.

For example, one may perform a test of the cornering forces at the test tire 42. In such a test, the anchor vehicle 20 is made to have tractive forces greater than the test vehicle 15, as previously described. The test and anchor vehicles 15, 20 are coupled together such that the anchor vehicle 20 maintains the test vehicle's speed and direction $H_T$. A sensor 40 is placed in operative relation to one tire or multiple tires as desired to measure the tire forces and moments during testing. Upon commencement of the test procedure, the test vehicle 15 may be placed in neutral and the anchor vehicle 20 driven to bring the test vehicle 15 to a desired velocity. As the vehicles 15, 20 are traveling, the test vehicle 15 may be steered to produce cornering forces at the test tire 42, which are detected by the sensor 40. The sensor 40 may detect these forces continuously or selectively such as upon activation by an operator.

When measuring forces on a single test tire 42 during cornering, it may be desirable to further isolate these forces by counteracting, reducing, augmenting, or otherwise altering the tractive forces generated at the tire 22 on the opposite side, relative to test tire 42, of the test vehicle 15. As will be understood, the opposite tire creates its own cornering forces during a turning maneuver. It may be desirable to augment or reduce the effects of these forces, and thus, the non-test tire 22 may be altered to that end. For example, the non-test tire 22 responsible for turning the vehicle may be disconnected such that it is not able to steer the vehicle, or the non-test tire 22 may be counter-steered to balance the forces created by the test tire 42. In addition, the tire 22 opposite the test tire 42 may have its treads removed or augmented such as by using tire chains or other means, to affect its ability to create tractive forces on certain surfaces.

In addition to changes made to the tire 22 itself, the tire 22 may be disconnected from the test vehicle's drive means, including the tie rod, differential, or drive shaft, such that the tire 22 is essentially free rolling. Further alteration may include varying braking forces at various tires 22, alterations to the type of differential including use of a spool differential, and altering the steering forces applied to the tires 22. For example, in terms of cornering, the non-test tire 22 may be disconnected from its tie rod such that the tire 22 is not steered during a cornering test.

As cornering testing proceeds, the sensor 40 communicates the forces and moments sensed at the test tire 42 to a controller 45 for recording, display, and analysis.

Similar sensing of the test tire 42 may be made during straight-line testing of braking or acceleration. For these types of tests, the test vehicle 15 and anchor vehicle 20 are coupled as described previously with the test vehicle 15 initially in neutral. The anchor vehicle 20 brings both vehicles 15, 20 up to a test speed and the brakes are applied to measure forces and moments on the tire 42 during braking. For example, the brakes may be applied until the test tire 42 locks. Once the brakes lock the tire, the operator may release the brakes in preparation for further testing or to conclude the braking test.

To measure forces and moments during acceleration, the vehicles 15, 20 are coupled as above, the test vehicle 15 placed in gear, and the anchor vehicle 20 accelerated to a test speed. At this point, the test vehicle 15 test tire 42 is accelerated to measure the forces and moments during this acceleration. This may be performed several times by accelerating and releasing the throttle repeatedly.

Further testing of tire performance may vary the load on the test tires by appropriate addition or removal of ballast to the test vehicle. The inflation of the test tire may also be varied as well as various other operational parameters, such as camber or inclination. The effects of these parameters on the test tire may be analyzed at different locations as well. Further, isolating the forces of the tire 22 by coupling the test vehicle 15 to an anchor vehicle 20 such that it is constrained in terms of lateral, longitudinal, and yaw movement allows testing on substantially any surface S. It is envisioned that the restrained vehicle dynamometer 10 may be used on any surface that the vehicle is likely to encounter, including snow, ice, dry or wet surfaces, gravel, sand, mud, dirt, new or worn pavement, and grooved surfaces. Further, the tests may include inclined surfaces or variations including mixtures of the surfaces described above. The number of variations is limited only by the desirability of obtaining information on the tire's performance in these conditions. Due to the mobile nature of the restrained vehicle dynamometer 10, it may be used for analyzing particular stretches of road. Further, the dynamometer 10 eliminates the need to bring the testing vehicle to a dedicated test center. As previously described, the testing method is not limited to a single type of test vehicle 15. The type of anchor vehicle 20 may be varied as well. The anchor vehicle 20 may be coupled to virtually any type of test vehicle 15 provided that the tractive forces are larger than those of the test vehicle 15. To accommodate different test vehicles 15, the anchor vehicle 20 may be modified as described above, and the coupler 25 may be adjusted to fit differing vehicles 15, 20.

One example of the coupling of an anchor vehicle 20 and test vehicle 15 is shown in the accompanying figures. An anchor vehicle 20 having a tractive force greater than the tractive force of the test vehicle 15 is provided. To generate the necessary tractive force, the anchor vehicle 20 may be selected or modified as previously described. In the embodiment shown, the anchor vehicle 20 is larger than the test vehicle 15, carries ballast 48, and has a larger overall tire footprint.

As will be appreciated, the anchor vehicle 20 shown may be adapted to accommodate different test vehicles 15. To accommodate test vehicles 15 having different tractive forces, the amount of ballast 48 carried may be increased or decreased as necessary. Further, in light of test vehicle size, the position of the coupler 25 between the vehicles 15, 20 may be varied, and the height of coupling at the anchor vehicle 20 may be varied as described below. In this manner, any type of wheeled test vehicle 15 may be tested, including among others motorcycles, automobiles, light-duty trucks, SUVs, heavy-duty trucks, and construction vehicles.

Figure 3:
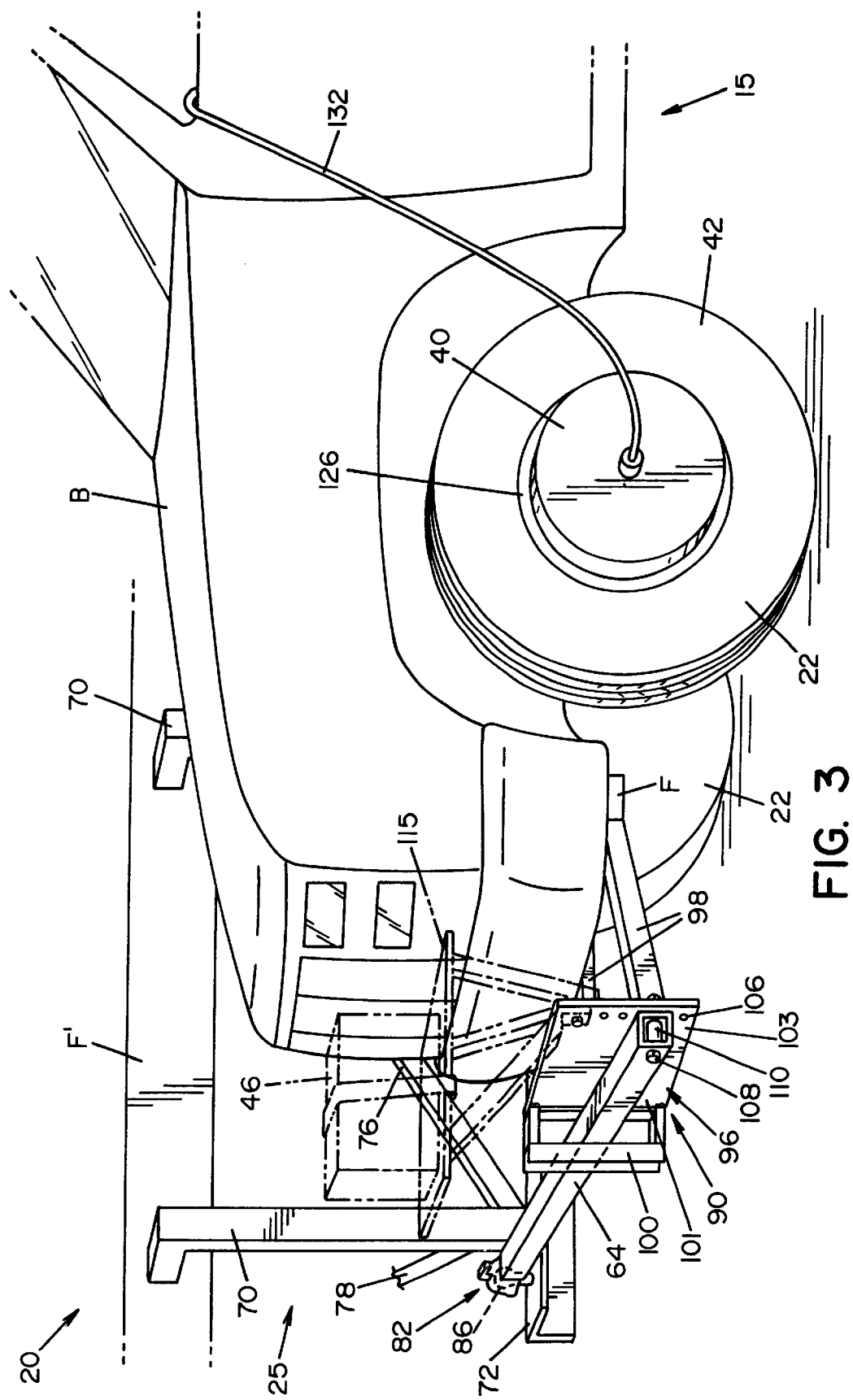
FIG. 3 is an enlarged side perspective view of a front portion of the dynamometer depicting one coupling of the test vehicle.

As best shown in FIGS. 1–3, the anchor vehicle 20 and test vehicle 15 are coupled by a suitable coupler 25. The coupler 25 restrains the test vehicle 15, relative to the anchor vehicle 20, such that the anchor vehicle 20 maintains or controls the velocity and direction of the test vehicle 15. To accomplish this, the test vehicle 15 may be longitudinally, laterally, and yaw restrained with some play allowed between the vehicles 15, 20 and the coupler 25. As shown in FIG. 2, the vehicles 15, 20 may be maintained in a substantially parallel relationship such that the heading ($H_T$), direction, and velocity ($D_T$) of the test vehicle 15 is substantially the same as the heading ($H_B$), velocity, and direction ($D_B$) of the anchor vehicle 20.

As previously described, the restraint of the test vehicle 15 isolates the forces and moments at the test tire 42. To accomplish this, a wide variety of couplings may be used including those having at least one arm extending between the vehicles 15, 20. These arms may be in any configuration including curved, diagonal, or straight relative to the vehicles. Further, these members may be suitably attached to the test vehicle 15 in any manner known in the art including welds or fasteners. In addition, attachment members may be incorporated on either vehicle 15, 20 to facilitate coupling such as plates, hooks, eyes, or brackets. Further, attachment may be underneath, overhead, or at the sides of test vehicle 15, 20 including the front 28, 52, back 30, 54, left 32, 56, right 34, 58, or combinations thereof. Such attachment may be made to the frame F, F' or the body B, B' of either vehicle 15, 20.

In the embodiment shown, a coupler 25 having two arms extends between the vehicles 15, 20 The coupler 25 having a forward arm 64 attached to the front 52 of the test vehicle 15 and to a forward portion of a bracket 65 extending from the anchor vehicle 20. The rear arm 66 is generally identical to the forward arm 64, but for its attachment between the rear 54, of the test vehicle 15, and a rear portion 68 of the bracket 65. In both the anchor vehicle 20 and the test vehicle 15, the coupler 25 is tied to the frame F, F' of each respective vehicle 15, 20.

In the shown anchor vehicle 20, the bracket 65 is suitably located adjacent any side 28, 30, 32, 34 of the anchor vehicle 20, including the longitudinal sides 32, 34 or the left side 32 as shown in FIG. 1. The bracket 65 may have supports extending from the bracket 65 to the frame F' of the anchor vehicle 20. The bracket 65 and its various members may be attached to anchor vehicle 20 or each other in any known manner including mechanical fasteners or welds. One suitable bracket 65, best shown in FIGS. 2 and 3, is depicted as having a plurality of vertical members 70 extending downwardly from the left side 32 of the anchor vehicle 20 in spaced relation to each other. These members 70 support a platform 72 that receives restraint arms 64, 66. As shown in FIGS. 1 and 3, the platform 72 is supported on the vertical members 70. Vertical members 70 may be spaced from the anchor vehicle 20 by a spacer such as a generally horizontal member or vertical members 70 may be L-shaped, as shown, to provide suitable clearance for the anchor vehicle's tires 26.

To increase the stiffness of the bracket 65 and provide longitudinal support to vertical members 70, a first angle iron 76 may extend between the spaced vertical members 70 along the length of the bracket 65, and a second iron 78 may extend from the frame F' of anchor vehicle 20 to a lower portion 80 of the bracket 65 to resist lateral forces from the test vehicle 15 and transfer them to the frame F' of the anchor vehicle 20.

The bracket 65 is provided with points of attachment 82, 84 for the arms 64, 66 that extend from the anchor vehicle 20 to the test vehicle 15. In the embodiment shown, the arms 64, 66 attach to the bracket 65 at the platform 72. Arms 64, 66 may be attached in any known manner and may be fixed or moveable as desired provided that they suitably restrain test vehicle 15. In the embodiment shown, the platform 72 is provided with ball hitches 86, 88 for this purpose. Ball hitches 86, 88 permit some movement, generally horizontal rotation, of the arms 64, 66. As depicted in FIG. 2, the arms 64, 66 may extend in a generally perpendicular fashion with respect to the platform 72 toward the test vehicle 15.

Figure 4:
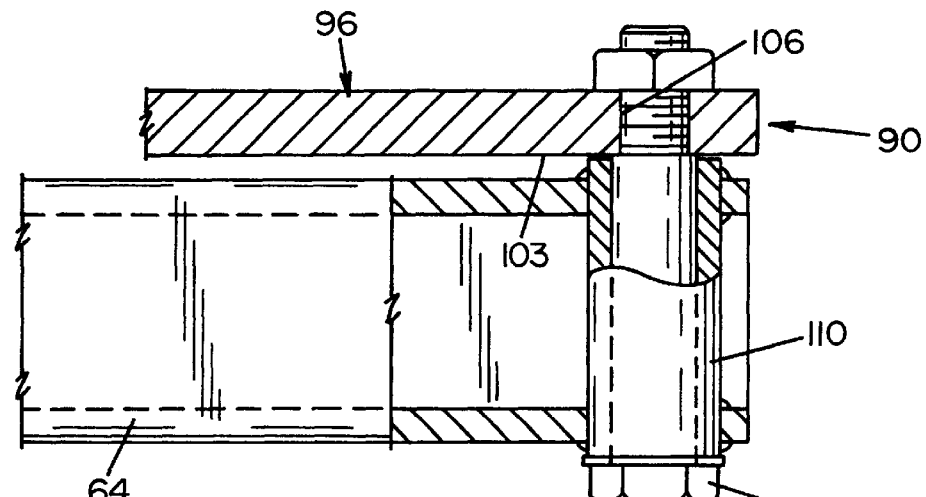
FIG. 4 is a plan view, partially in section, of a portion of a restraint arm as might be seen along line 4—4 in FIG. 1.
Figure 5:
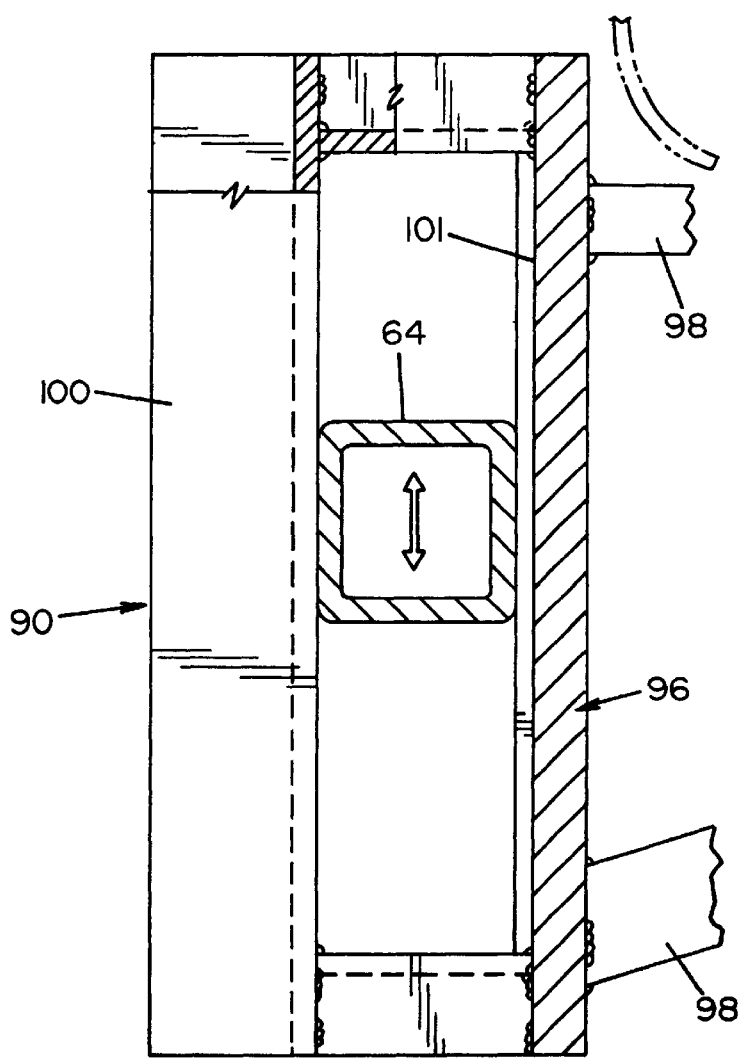
FIG. 5 is a side view, partially in section, of a portion of a restraint arm as might be seen along line 5—5 in FIG. 1.

The test vehicle 15 shown is provided with arm receiving members 90, 90' at the front 52 and rear 54 of the test vehicle 15. Since the arm receiving members 90, 90' at the front 52 and rear 54 of the test vehicle 15 generally are identical in construction and essentially mirror images of each other, only the front attachment member 90 will be described in detail. It will be appreciated that non-identical members 90 may be used, or arms 64, 66 may be connected elsewhere on test vehicle 15. With reference to FIG. 3, front attachment member 90 includes a plate 96 tied to the frame F of test vehicle 15 by supports 98. A load 46 may be supported by a load receiving member 115 attached to plate 96 near supports 98. The plate 96 may include a channel member or sleeve 100 to receive front arm 64 and allow some vertical movement of the arm 64. The sleeve 100 is located on one side 101 of the plate 96 nearest to the anchor vehicle 20 or inward side 102 of test vehicle 15 at a second side 103 of plate 96 near the outboard side 104 of test vehicle 15, the plate 96 is provided with a plurality of holes 106 for receiving a fastener 108 attaching the arm 64 to the plate 96. As will be appreciated, the holes 106 may be spaced vertically to make height adjustments to the coupler 25 or horizontally spaced holes may be incorporated when adjustment to the spacing of the vehicle 15 is desired. Further, these holes may be aligned as shown in FIG. 1. As best shown in FIG. 4, the arm 64 or fastener 108 may be fitted with a sleeve 110 through which the fastener 108 passes before attachment to the plate 96 to allow rotation of the arm 64 and plate 96 relative to each other when a threaded fastener is used.

The arms 64, 66 may be any size, shape, or cross section and are illustrated generically as generally square channel members. Further, the arms 64, 66 may be any length depending on the desired amount of spacing between vehicles 15, 20 with attention to the point of attachment on each of the vehicles 15, 20. As in the case of the attachment member 90, the front and rear arms 64, 66 are substantially identical except for their location at the front 52 and rear 54 of the test vehicle 15.

With the vehicles 15, 20 coupled, a sensor 40 is used to measure forces and moments on a single test tire 42 or multiple test tires on the vehicle. As previously discussed, a number of suitable sensors 40 are available including the MTS SWIFT™. Such a sensor 40 is schematically depicted in FIG. 3. The sensor 40 is suitably mounted proximate to the tire 22, and, in the case of the MTS SWIFT™, it may be attached directly to the wheel 126. Further, the MTS SWIFT™ may be used in combination with a restraint bracket as described in U.S. Pat. No. 5,952,567 which extends from the wheel center on either side of the wheel 126 and is connected by an integrally formed substantially horizontal member above the tire 22.

The sensor 40 communicates with a controller 45 in a known manner such as via cable 132 as shown. The controller 45 may be located in either vehicle 15, 20, outside of the vehicles, if a wireless transmitter is used, or within the test vehicle 15 as shown schematically in FIG. 2. In this way, the controller 45 may display information to the test vehicle operator. The controller 45 may additionally store and analyze the data produced by the sensor 40. In an automated system, the controller 45 may also be used to control, perform or coordinate the test vehicle 15 testing of the test vehicle 15. Consequently, the controller 45 may communicate with the braking and steering systems, in addition to sensor 40, of the vehicle 15 or a robotic driver. Alternatively, the robotic driver may be capable of receiving, storing, and analyzing the data directly from the sensor 40.

Figure 6:
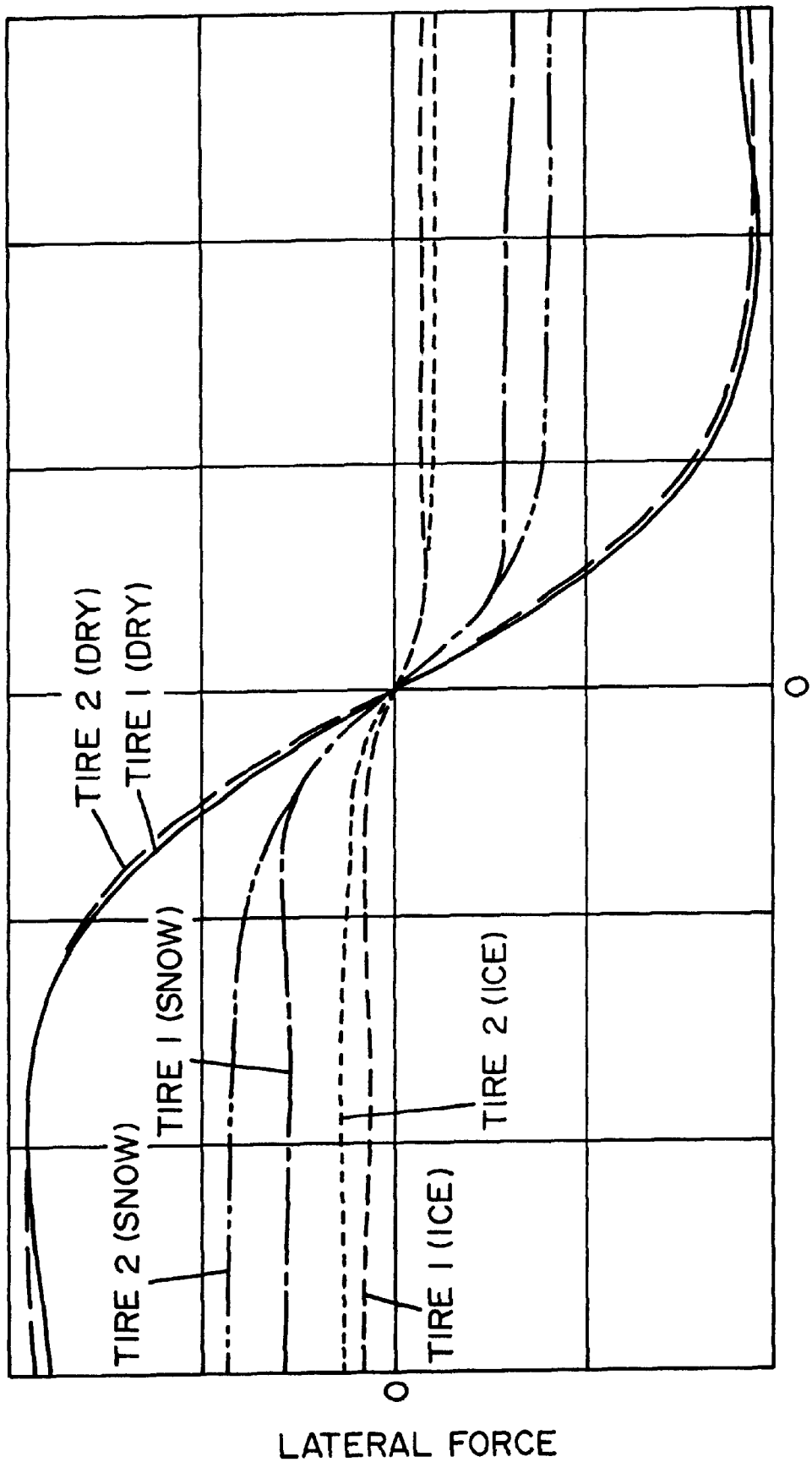
FIG. 6 is a plot of lateral forces versus slip angle as measured by the present invention during a cornering test of a tire.
Figure 7:
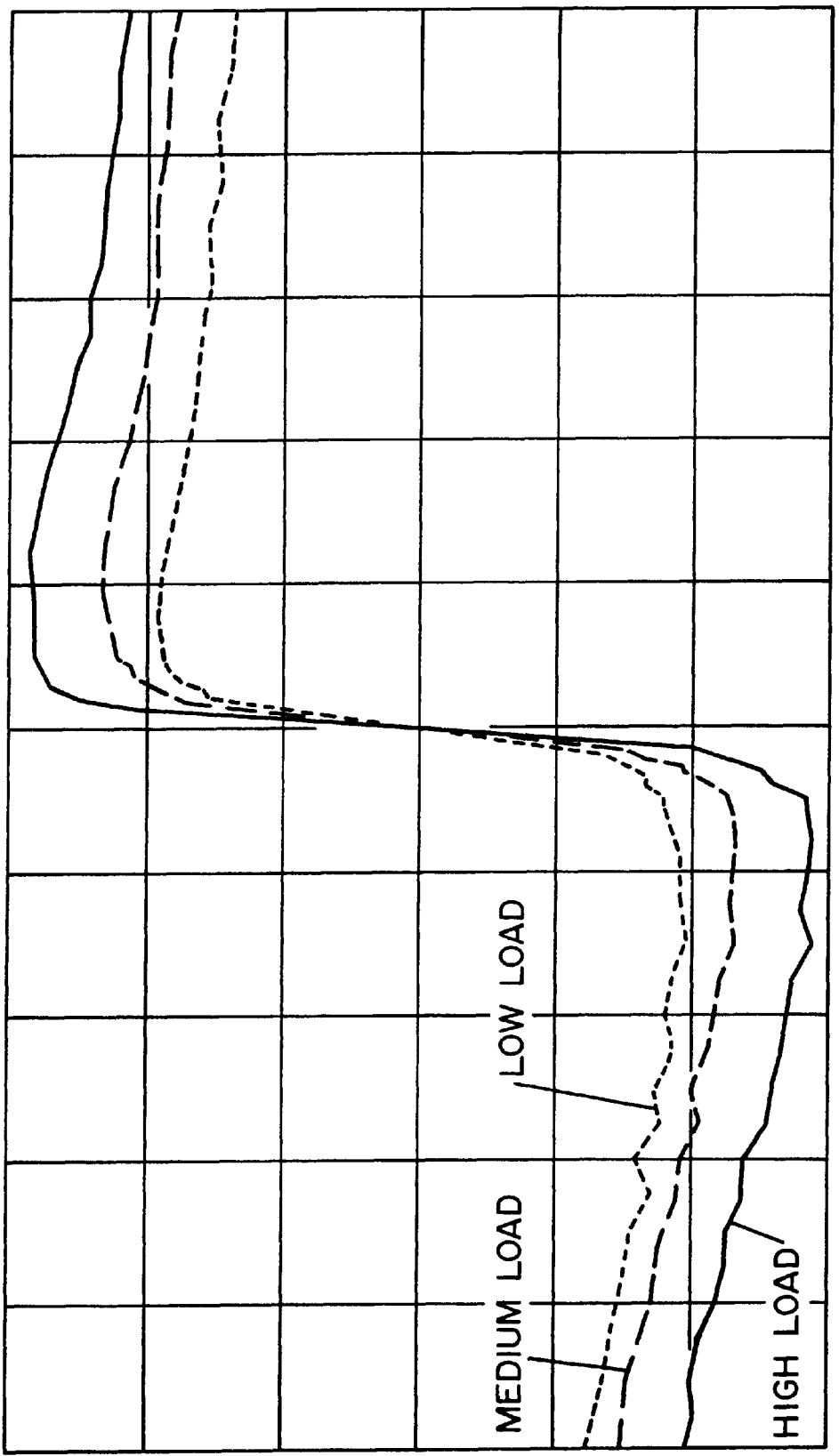
FIG. 7 is a plot of longitudinal forces as measured by the present invention during straight line testing of a tire.

With the data accumulated by the controller 45, process algorithms may be generated to better analyze the data. Additionally, the data may be used to generate plots of the forces and moments measured by the sensor 40 corresponding to various inputs such as slip angle, acceleration, and braking force. An example of such a plot is shown in FIG. 6. This plot illustrates the lateral forces measured by a sensor at corresponding slip angles during cornering maneuvers. A second plot, FIG. 7, illustrates longitudinal forces at corresponding slip angles as measured during straight-line testing with three loads applied to the test vehicle 15. These plots are for illustrative purposes and are not to be construed as limiting.

EXAMPLE

The following example is provided to describe one testing of the above method and apparatus. This example is provided for illustrative purposes only and does not limit the present invention. For purposes of the example, two vehicles were coupled to each other. The test vehicle was a 4-wheel drive pick-up and the anchor vehicle was a long wheelbase flat bed semi-tractor. The flat bed carried ballast in the form of cement blocks. The ballast was secured to the bed by chains. The vehicles were constrained such that they maintained the same heading angle and relative fore-aft positions. Within a limited range, the vehicles were free to move vertically and roll and pitch relative to each other. An MTS SWIFT™ force transducer was attached to the left front wheel. The slip angle of the test wheel was controlled by using a marked steering wheel. Measurements were taken at the outboard front wheel because it was believed that this location received the least amount of debris or splash from other tires on the test and anchor vehicles. Driving and braking torque was also applied to the test wheel during testing. The right front tire opposite the test tire was buffed to remove its tread, so that in cornering tests, its steering forces were minimized on snow and ice. For acceleration tests, both front wheels were driven and a traction chain was installed on the right front tire to prevent slippage. For braking tests, the brakes on the test vehicle were disabled on all but the test wheel. The anti-lock braking system on the test vehicle was disabled and the vehicle's braking system was modified by the addition of a flow-restricting valve and pressure accumulator to reduce the speed of brake application improving control of the test wheel brake.

The MTS SWIFT™ 6-axis spinning wheel integrated force transducer used to measure force and moments of the test tire. To account for the low friction coefficients expected during snow and ice testing, the sensitivity of the sensor was increased.

The instrumentation on the test vehicle recorded the tire forces and moments, vehicle speed, tire rotational speed, slip angle, and other test parameters. The data acquisition system acquired data from all channels simultaneously at a rate of 30 hertz per channel.

Two commercially available tires were purchased for testing purposes. The first had lug type treads and the second tire was of a rib design. The tires were prepared to simulate an in-service condition before testing. During testing, a single inflation pressure was used for all of the tests.

Three types of tests were conducted to evaluate the tires on ice and medium hard-packed snow, namely, free-rolling cornering, straight-line traction (acceleration and braking), and cornering combined with acceleration and braking. For these tests, the tires were evaluated at three separate curb loads. Further, the tests were performed at three different speeds.

The testing was performed at Smithers' Winter Environment Test Center in Raco, Mich. This location provided controlled snow and ice surfaces for tire testing. The snow surface used was approximately 1.6 kilometers long and 45 meters wide. The ice surface was a 550 meter pad. When testing on the ice pad, the anchor vehicle remained on the snow beside the pad.

For the cornering test, the tire chain was removed from the right front tire of the test vehicle, leaving the treadless tire opposite the test tire. The test vehicle was placed in neutral and the anchor vehicle accelerated to the test speed. Then, the test vehicle was steered left to produce a slip angle of +20°. Data acquisition was started. After which, the test vehicle was then steered from left to right at a constant low rate to investigate substantially steady-state behavior and to minimize dynamic cornering effects. Results of this test are plotted in FIG. 6 and show curves representing the performance of the tires on snow and ice as measured by the test vehicle. The curve for a dry surface was produced on a simulator for comparison.

In separate tests, straight-line acceleration and braking and combined cornering and acceleration and braking were evaluated. For these tests, a traction chain was installed on the right front tire opposite the test tire to prevent this tire from spinning out under driving torque. The test vehicle was placed in gear, and the anchor vehicle accelerated to the test speed. The test vehicle was steered to the test slip angle, straight ahead, or some fixed slip angle. Data acquisition was then started. The test driver then slowly applied the throttle until the test wheel had spun up to the desired speed, which in this case was approximately 100% slip or twice the free rolling speed. Then the throttle was released. Three to four iterations were made. Next, the test vehicle was placed in neutral and the driver gradually applied braking force to the test wheel until it locked. Once locked, the brake was released. During a single pass, three to five braking events were made. FIG. 7 represents a plot for straight-line traction for a single tire at three separate loads (low, medium, and high).

As a result of these tests, information regarding the forces at the tires was produced. Specifically, information relating to available cornering force, braking and acceleration force on snow and ice was obtained.

Thus, it should be evident that the restrained vehicle dynamometer disclosed herein carries out one or more of the objects of the present invention set forth above and otherwise constitutes an advantageous contribution to the art. As will be apparent to persons skilled in the art, modifications can be made to the preferred embodiments disclosed herein without departing from the spirit of the invention, the scope of the invention herein being limited solely by the scope of the attached claims.

What is claimed is:

1. A method of testing at least one test tire of a test vehicle provided with a sensor for taking measurements at the test tire, the method comprising:

coupling the test vehicle to an anchor vehicle wherein the coupling restricts the lateral, longitudinal, and yaw movement of the test vehicle relative to the anchor vehicle such that the anchor vehicle maintains the heading and velocity of the test vehicle; and performing dynamic testing on the test tire of the test vehicle while the test vehicle is coupled to the anchor vehicle, wherein the vehicles are coupled in a side-by-side configuration.

2. The method of claim 1, wherein the vehicles are held in substantially parallel relation to each other.

3. The method of claim 1, wherein a centers of gravity of each of said vehicles are substantially aligned in the longitudinal direction.

4. A method of testing at least one test tire of a test vehicle provided with a sensor operatively interrelated with the test tire, the method comprising:

coupling the test vehicle to an anchor vehicle;

applying a maneuvering force to the test tire independently of the forces of the anchor vehicle, wherein the coupling restricts the lateral, longitudinal, and yaw movement of the test vehicle relative to the anchor vehicle such that the anchor vehicle maintains the heading and velocity of the test vehicle in spite of the maneuvering force applied to the test tire; and receiving data from the sensor.

5. The method of claim 4, wherein applying a maneuvering force includes steering the test tire.

6. The method of claim 4, wherein applying a maneuvering force includes accelerating the test tire.

7. The method of claim 4, wherein applying a maneuvering force includes decelerating the test tire.

8. The method of claim 4, wherein coupling occurs such that the center of gravity of the anchor vehicle is substantially aligned with a steering tire of the test vehicle.

9. The method of claim 4, wherein coupling of the test vehicle acts as if coupling occurs on a roll axis of the test vehicle.

10. The method of claim 4, wherein the anchor vehicle has tractive forces greater than tractive forces of the test vehicles.

11. The method of claim 4, further comprising allowing some play between the vehicles such that the vehicles can roll, pitch, or move vertically with respect to each other.

12. The method of claim 4, further comprising applying a known load to the test vehicle.

13. The method of claim 12, wherein a sensor is placed in sensing relationship with at least one test tire on the test vehicle and wherein applying a load to the test vehicle includes applying the load near a sensed tire.

14. The method of claim 4, further comprising altering tractive forces on at least one non-test tire.

15. A method of testing at least one test tire of a test vehicle provided with a sensor for taking measurements at the test tire, the method comprising:

coupling the test vehicle to an anchor vehicle wherein the coupling restricts the lateral, longitudinal, and yaw movement of the test vehicle relative to the anchor vehicle such that the anchor vehicle maintains the heading and velocity of the test vehicle; and performing dynamic testing on the test tire of the test vehicle while the test vehicle is coupled to the anchor vehicle, wherein the test vehicle is controlled by a robotic driver.

* * * * *